Nov. 1, 1949.    R. W. GILBERT    2,486,641

MEASURING AND CONTROL APPARATUS

Filed Oct. 14, 1944

Inventor:
Roswell W. Gilbert,
By Pierce + Scheffler,
Attorneys.

Patented Nov. 1, 1949

2,486,641

UNITED STATES PATENT OFFICE 2,486,641

MEASURING AND CONTROL APPARATUS

Roswell W. Gilbert, Montclair, N. J., assignor to Weston Electrical Instrument Corporation, Newark, N. J., a corporation of New Jersey Application October 14, 1944, Serial No. 558,754

19 Claims. (Cl. 171—95)

This invention relates to measuring and control apparatus, and particularly to electrical apparatus of high sensitivity that includes an amplifying direct current-to-alternating current converter that will be termed an "induction galvanometer."

The induction galvanometer is a sensitive direct current instrument that includes, in addition to the usual permanent magnet and pivoted coil, an alternating current field coil for introducing a ripple component into the magnetic field flux. When the pivoted coil is in the normal zero position, its inductance mutual to the field ripple is zero and no alternating current is induced in the moving coil. When the coil is deflected from zero position by direct current, an alternating current component proportional to the deflection angle and varying in phase with the direction of the displacement is induced in the moving coil. The induced alternating current voltage is introduced into a load circuit having a transformer coupling to the direct current measuring circuit, and the energy amplification obtained when the output alternating voltage is matched to the load is very high.

Objects of the invention are to provide induction galvanometers of the construction stated above, and measuring and/or control apparatus including such induction galvanometers. An object is to provide measuring and/or control apparatus of the relay type that includes an induction galvanometer for developing alternating current output voltages of substantially higher magnitude than the direct current voltage that deflects the moving coil of the induction galvanometer. A further object is to provide a control apparatus including an induction galvanometer, an amplifier connected to the induction galvanometer to form a closed regenerative system, and a relay operated by the amplifier when the moving coil deflects from zero to a point at which the amplifier breaks into oscillation.

Figure 1:
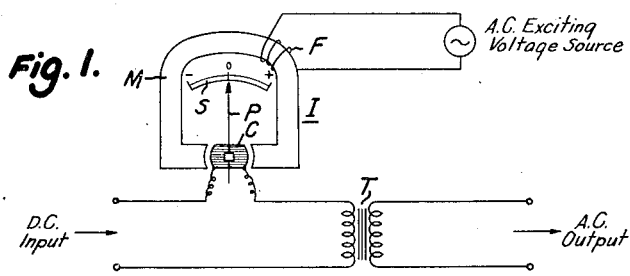
Figure 2:
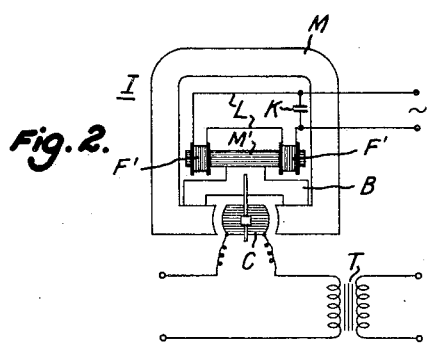
Figure 3:
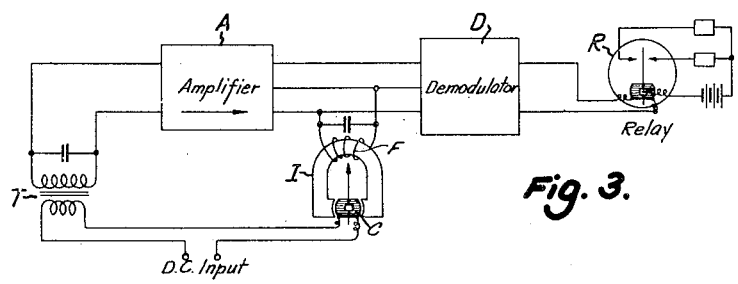
Figure 4:
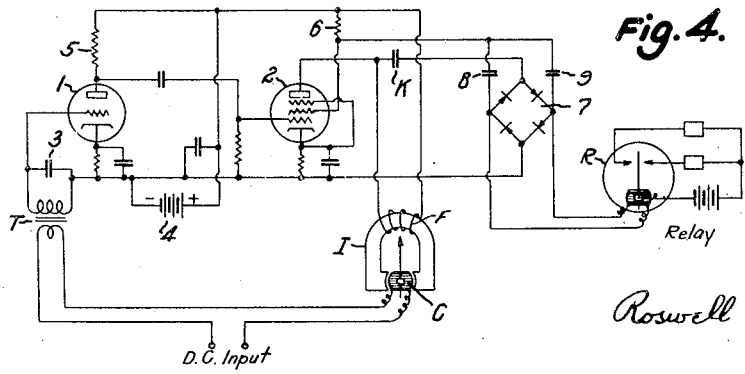

These and other objects and advantages of the invention will be apparent from the following specification when taken with the accompanying drawings in which:

Figs. 1 and 2 are diagrammatic views of induction galvanometers embodying the invention; and Figs. 3 and 4 are a schematic diagram and a circuit diagram, respectively, of a regenerative relay system.

In Figs. 1 and 2 of the drawings, two specifically different forms of induction galvanometers are illustrated schematically as including the permanent magnet M and moving system of a direct current measuring instrument, the moving system being the conventional coil C and a pointer P that moves along a scale S in opposite directions from a "normal zero center" graduation, see Fig. 1. The alternating current field excitation system may be a winding F on the permanent magnet M, as shown in Fig. 1, or a pair of excitation windings F', F' on a magnetic core M' that is similar, in construction and arrangement, to a magnetic shunt across the air gap of the permanent magnet field structure, see Fig. 2. The magnetic shunt M' may be mounted on the instrument base or, as shown, may be supported from the magnet M by brackets B. The alternating current voltage induced in the moving coil C upon its deflection from zero center position is introduced into a signal or control circuit by a transformer T having a primary winding in series with the coil C and the variable voltage or current source, not shown, of the direct current input circuit.

The superposing of a ripple component upon the permanent magnet field and the resultant induction of an alternating current voltage in the direct current input circuit does not adversely affect the basic measuring operation, i. e. the deflection of the coil C in response to variations in the magnitude of a minute direct current or direct current voltage that fluctuates with a control factor that may be temperature, pressure, humidity or the like. Certain design limitations should be satisfied, for example the magnitude of the alternating current excitation field should be limited to a value that will not unduly affect the steady field flux component, but a high order of energy amplification is obtained at permissible ripple flux intensities. The alternating current energy developed in the moving coil C varies with the frequency of the ripple excitation source, except for certain losses, and it is therefore desirable to employ a relatively high driving frequency, for example of the order of 10 kilocycles for energizing the field windings F or F', F'. A built-in condenser K is preferably shunted across the leads L of the excitation windings F', F', see Fig. 2, to resonate the windings at the frequency of the alternating current excitation source.

There should be no alternating current output when the coil C is in normal zero center position, and this design condition may be readily satisfied in spite of such structural or magnetic dissymmetries as arise in commercial production by adjustment of the location of the leads L, L of the excitation windings. An enormous amplification is obtained in the conversion of minute direct current values to alternating current values. For example, one induction galvanometer that was produced by adding an alternating current excitation system to a sensitive suspension galvanometer of known commercial manufacture delivered an output alternating current voltage of 30 millivolts in response to a direct current input of 0.06 millivolt, a voltage amplification of 500.

The induction galvanometer may be incorporated in sensitive measuring and/or control circuits of various types to obtain different effects and, as a typical application, a regenerative relay circuit of simple design is illustrated in Figs. 3 and 4.

As shown schematically in Fig. 3, the induction galvanometer I and amplifier A are arranged to form a closed regenerative system by connecting the moving coil circuit to the amplifier input by the transformer T and connecting the excitation field winding F to the amplifier output. When the moving coil C deflects from zero center to a point where the in-phase energy feedback is greater than the reciprocal of the amplifier gain, the system will break into oscillation and the condition of oscillation is used to control a relay R. A simple on-off relay working out of the amplifier through a demodulator D may be sufficient for some purposes but, in general, a directional sensing of the moving coil deflection for operation as a polarized relay is required in industrial control applications.

This condition is readily satisfied by tuning the excitation field winding and avoiding any input phase shift between the transformer T and the amplifier A, whereby the amplifier input is in quadrature with any resonant applied field voltage, leading or lagging depending upon the direction of the moving coil deflection. As regeneration at the fundamental frequency is thus in quadrature the system will oscillate at that frequency at which the inphase regenerative component is a maximum rather than at the resonant frequency of the field circuit. The oscillation frequency will be higher than the resonant field frequency for moving coil deflection in one direction and lower for moving coil deflection in the opposite direction.

Assuming truly quadrature feedback at the resonant field frequency, the inphase feedback component will be a maximum at the frequency at which the reactance equals the resistance in the field circuit. The tangent of the phase angle then equals 1, and the circulating current in the field coil will be 45° out of phase with the amplifier output, either leading or lagging depending upon the direction of the moving coil deflection. This phase reversal is utilized, in a regenerative relay circuit such as shown in Fig. 4, to operate a polarized relay by means of a copper oxide modulator bridge.

The amplifier of the Fig. 4 relay comprises a pair of resistance coupled stages, the tube of the first stage being a high mu triode 1 and the tube of the second stage being a pentode 2. The measuring circuit includes the coil C of the induction galvanometer I and the primary winding of the transformer T. The secondary winding of the transformer is the input circuit of the tube 1, the winding being shunted by a peaking condenser 3. The plate supply source 4 is connected to the plate of tube 1 through the load resistor 5, to the screen grid of tube 2 through the screen resistor 6, and to the plate of tube 2 through the field winding F of the induction galvanometer. The conventional circuit resistors and by-pass condensers for the cascaded amplifier stages are illustrated in the drawing but not separately identified by reference numerals.

The field circuit circulating current is introduced into the copper oxide modulator bridge 7 by connecting one set of opposite junctions of the bridge in series with the field resonating condenser K, and the amplifier output is introduced as the second bridge component by connecting the other set of bridge terminals to the screen of the second stage tube 2 through condensers 8, 9 that also serve as by-pass condensers for the screen grid circuit. The winding of a polarized or sensitive instrument type relay R is connected across the second set of bridge terminals.

Deflection of the moving coil C of the induction galvanometer I by the current established in the measuring circuit will vary, in accordance with the direction of the coil displacement, the current flow in the coil of the polarized relay R, and the cascaded amplifier will break into oscillation to establish an energizing current for the relay R when the coil C of the induction galvanometer is deflected through a preselected angle from its zero or neutral position.

The invention is not limited to the embodiments herein shown and described, and it is to be understood that various changes that may occur to those familiar with the design and construction of sensitive electrical measuring instruments and electronic relay circuits fall within the scope of the invention as set forth in the following claims.

I claim:

1. In an amplifying converter, the combination with a sensitive direct current measuring instrument having means developing a steady magnetic field across a space gap, and a coil pivotally supported in said space gap for angular displacement in accordance with the direct current through said coil, of means for superposing a periodically varying magnetic field upon said steady magnetic field, whereby an alternating current is induced in said coil upon displacement of the same from zero center position.

2. An induction galvanometer comprising a permanent magnet structure having spaced poles, a coil adapted for conductive coupling to a source of direct current of variable magnitude and supported for angular displacement in the gap between said poles in response to direct current traversing the coil, and means for superposing a periodically varying magnetic field upon the steady magnetic field of said permanent magnet structure, said coil being normally in a position of zero mutual coupling to the periodically varying magnetic field.

3. An induction galvanometer as recited in claim 2 wherein said means comprises a field coil on said permanent magnet structure.

4. An induction galvanometer as recited in claim 2 wherein said means comprises a field coil in magnetic shunt relationship to the interpolar gap of said permanent magnet structure.

5. An induction galvanometer as recited in claim 2 wherein said means comprises a field coil in magnetic shunt relationship to the interpolar gap of said permanent magnet structure, and a core of magnetic material for said field coil.

6. In apparatus for voltage amplification, a direct current source developing a minute current that varies in magnitude with a factor to be measured or controlled, a sensitive direct current instrument including a permanent magnet structure and a coil supported for angular displacement in an air gap of said permanent magnet structure, a measuring circuit including said coil and direct current source, means for superposing a periodically varying magnetic field upon the steady magnetic field of said permanent magnet structure, and an alternating current output circuit network inductively coupled to said measuring circuit.

7. In relay apparatus, a sensitive direct current instrument comprising a coil pivotally supported for angular displacement in the interpolar gap of a permanent magnet field structure, a measuring circuit including said coil and a direct current source of variable output, an excitation winding for superposing a periodically varying magnetic field upon the steady magnetic field developed by said permanent field structure, whereby an alternating current is developed in said coil upon displacement of the same from zero center position in said interpolar gap, and an alternating current circuit network; said alternating current circuit including an electronic alternating current amplifier having an input circuit comprising the secondary winding of a transformer having a primary winding in series in said measuring circuit, and said excitation winding being in the output circuit of said amplifier.

8. In relay apparatus, a sensitive direct current measuring instrument including a coil angularly movable in the interpolar gap of a magnetic field structure developing in said gap a magnetic field having a steady component and a superposed periodically varying component, an electronic amplifier, a primary circuit including said coil in series with a fluctuating direct current source and the primary winding of a transformer, the secondary winding of said transformer being in the input circuit of said amplifier, an output circuit network for said amplifier, circuit elements connected to said network for developing the varying magnetic field component, a demodulator in said output circuit network, and a load circuit connected to said demodulator.

9. In relay apparatus, the invention as recited in claim 8 wherein said amplifier includes a plurality of cascaded amplifier stages.

10. In a galvanometer for responding to a unidirectional current, a magnetizable structure having an air gap, a coil adapted to carry said current and movable in said gap, means for producing in said structure and in said gap a unidirectional magnetic field, means for superimposing an alternating component upon said field, and means connected with said coil and responsive to alternating E. M. F. induced therein.

11. In a galvanometer for responding to a unidirectional current, a magnetizable structure having an air gap, a coil adapted to carry said current and movable in said gap, means for producing in said structure and in said gap a unidirectional magnetic field, means for causing the strength of said field to vary periodically through a predetermined cycle of intensity, and means connected with said coil and responding to alternating E. M. F. induced therein.

12. An electric instrument having a magnetizable structure including a gap, a deflectable winding having conductors adapted for limited movement in said gap, means for exciting said structure to produce a unidirectional magnetic field in said gap, means for exciting said structure to produce a superimposed alternating magnetic field in said gap, means for impressing upon said winding an electromotive force to be detected, and measuring means responsive to alternating electromotive force induced in said winding.

13. In an electric instrument, a magnetizable structure, means for producing in said structure a magnetic field having superimposed a unidirectional component and an alternating component, said superimposed components being geometrically coincident, a deflectable winding having conductors movable in said field, means for impressing upon said winding a unidirectional E. M. F. to produce a current adapted to react with said field to deflect said winding, and measuring means responsive to alternating electromotive force induced in said winding.

14. In an electric instrument, a magnetizable structure, means for producing in said structure a magnetic field having a unidirectional component and an alternating component, said components being geometrically coincident, a deflectable inductive winding having conductors movable in said field and normally occupying a position of zero mutual inductance with the same, means for passing through said conductors a unidirectional current to react with the corresponding component of said field to deflect said winding away from said position of zero mutual inductance, and means responsive to alternating electromotive force induced by said alternating component in said winding when deflected.

15. In an electric instrument for responding to a unidirectional current, the combination of an element angularly deflectable about an axis, said element including conductor means having a directional component substantially parallel to said axis and movable in a sense substantially perpendicular thereto, means to provide a magnetic field having superimposed unidirectional and alternating components, means for causing said components to follow a common path having a directional component substantially perpendicular both to said conductor means and to the motion of the same, means providing a path for said unidirectional current and including said conductor means, and further means coupled to said conductor means and sensitive to electromotive force induced in the same.

16. Electrical apparatus comprising a structure providing an air gap, a deflectable winding movable in said gap, means for providing in said gap a magnetic field comprising unidirectional and alternating components, means for impressing upon said winding a unidirectional E. M. F. to produce a current adapted to react with the corresponding component of said field to deflect said winding, and means responsive to alternating E. M. F. induced by said alternating component in said winding when deflected.

17. Electrical apparatus for responding to a unidirectional current, said apparatus comprising a structure providing an air gap, a coil adapted to carry said current and movable in said gap, means for producing in said gap a magnetic field having unidirectional and alternating components, and means connected to said coil and responsive to alternating E. M. F. induced therein for measuring said E. M. F.

18. Electrical apparatus comprising a magnetic structure having a space gap, a deflectable winding in said space gap, means for producing a unidirectional magnetic field within said space gap, a field coil associated with the magnetic structure, an electronic amplifier connected between the field coil and the deflectable winding, means for impressing a unidirectional E. M. F. upon the winding to produce a current adapted to react with the unidirectional magnetic field to deflect said winding into a position of mutual induction with the field coil, and thereby to establish a condition of oscillation in the circuit and amplifier, and means responsive to the condition of oscillation of the circuit.

19. Electrical apparatus comprising a magnetic structure having a space gap, a deflectable winding in said space gap, means for producing a unidirectional magnetic field within the space gap, a field coil associated with the magnetic structure, an electronic amplifier connected in a circuit including the field coil and the deflectable winding, means establishing a condition of resonance in the circuit, means for impressing a unidirectional E. M. F. upon the winding to produce a current adapted to react with the unidirectional magnetic field to deflect said winding into a position of mutual induction with the field coil, thereby to establish a condition of oscillation in the circuit and amplifier, the frequency of oscillation being determined by the direction in which said winding is deflected, and means selectively responsive to the oscillation frequency of the circuit.

ROSWELL W. GILBERT.

REFERENCES CITED

The following references are of record in the file of this patent:

UNITED STATES PATENTS

| Number | Name | Date |
|---|---|---|
| Re. 21,659 | Adler | Dec. 17, 1940 |
| 1,873,926 | Centeno | Aug. 23, 1932 |
| 1,915,804 | Smith | June 27, 1933 |
| 2,320,881 | Newton | June 1, 1943 |
| 2,368,701 | Borden | Feb. 6, 1945 |

FOREIGN PATENTS

| Number | Country | Date |
|---|---|---|
| 487,016 | Germany | Nov. 30, 1929 |